(12) United States Patent
Lindblad

(10) Patent No.: US 6,315,975 B1
(45) Date of Patent: Nov. 13, 2001

(54) SUSPENSION SYSTEM USING FUMED SILICA

(75) Inventor: Donald Edward Lindblad, Plano, TX (US)

(73) Assignee: Rhodia Inc., Canbury, NJ (US)

( * ) Notice: Subject to any disclaimer, the term of this patent is extended or adjusted under 35 U.S.C. 154(b) by 0 days.

(21) Appl. No.: 09/394,207

(22) Filed: Sep. 10, 1999

(51) Int. Cl.⁷ .................................................... C01B 17/90

(52) U.S. Cl. .................... 423/531; 423/558; 423/DIG. 1; 423/DIG. 2; 252/182.32

(58) Field of Search .................... 423/DIG. 1, DIG. 2, 423/531, 522, 530, 558; 252/182.32

(56) References Cited

U.S. PATENT DOCUMENTS

| | | | | |
|---|---|---|---|---|
| 1,489,347 | * | 4/1924 | Davison | 423/DIG. 2 |
| 3,097,064 | * | 7/1963 | Caldwell | 23/88 |
| 3,203,758 | * | 8/1965 | Wainer | 23/167 |
| 3,677,701 | * | 7/1972 | Hollingsworth et al. | 423/531 |
| 3,689,217 | * | 9/1972 | Capaul et al. | 423/531 |
| 4,153,628 | * | 5/1979 | Gerken et al. | 423/531 |

* cited by examiner

*Primary Examiner*—Steven P. Griffin
*Assistant Examiner*—Timothy C. Vanoy
(74) *Attorney, Agent, or Firm*—Daniel P. Cillo; Alan G. Towner; Eckert Seamans Cherin & Mellott, LLC

(57) ABSTRACT

Fumed silica is used to suspend iron sulfates in concentrated sulfuric acid. The suspension system substantially reduces iron sulfate deposits in steel containment vessels.

30 Claims, No Drawings

SUSPENSION SYSTEM USING FUMED SILICA

FIELD OF THE INVENTION

The present invention relates to a system for suspending sulfates in acid, and more particularly relates to the use of fumed silica to suspend iron sulfates in concentrated sulfuric acid.

BACKGROUND INFORMATION

Sulfuric acid is conventionally manufactured, transported, and stored in carbon steel vessels. The carbon steel does not corrode in the presence of concentrated sulfuric acid because of the formation of a protective layer of iron sulfate (ferrous sulfate) on the walls and bottom of the vessels. Over time, the iron sulfate layer builds up and in some older vessels can be measured in inches or feet. When vessels are cleaned, the iron sulfate has to be removed. Since it is denser than the acid, it is found in the bottom of the vessel and has to be removed physically, e.g., shoveled out. Alternatively, the iron sulfate may be dissolved with water. However, this method of removal is a problem since dilute sulfuric acid develops with high concentrations of iron sulfate, which is very corrosive.

Development of a suspension system in concentrated sulfuric acid to keep the iron sulfate fluid is a complex problem. Most polymer viscosity enhancers employed in the industry are used in aqueous or organic systems. However, sulfuric acid either reacts with such polymers to form $SO_2$ and water, or the material is not soluble in it. To date, satisfactory compounds have not been developed for the control of viscosity and suspension of iron sulfate in concentrated sulfuric acid.

SUMMARY OF THE INVENTION

An aspect of the present invention is to provide a composition comprising concentrated sulfuric acid, iron sulfate suspended in the concentrated sulfuric acid, and fumed silica.

Another aspect of the present invention is to provide a steel container comprising concentrated sulfuric acid, iron sulfate, and fumed silica, wherein a substantial portion of the iron sulfate is suspended in the concentrated sulfuric acid.

A further aspect of the present invention is to provide a method of suspending iron sulfate in concentrated sulfuric acid comprising adding fumed silica to the concentrated sulfuric acid.

Another aspect of the present invention is to provide a method of reducing iron sulfate deposits on steel vessels containing concentrated sulfuric acid, the method comprising adding fumed silica to the concentrated sulfuric acid.

These and other aspects of the present invention will be more apparent from the following description.

DETAILED DESCRIPTION

The present invention provides a system to keep iron sulfate in suspension in concentrated sulfuric acid, e.g., concentrations of greater than about 50 weight percent. It has been found in accordance with the present invention that fumed silica develops viscosity in concentrated sulfuric acid.

Sulfuric acid concentrations of from about 50 to about 99.5 weight percent, technical to spent, are preferably treated in accordance with the present invention. For example, concentrations of from 93 to 98 weight percent may be treated in accordance with a particular embodiment. The remaining portion of the sulfuric acid-containing liquid may comprise water and iron sulfate, and may also comprise waste materials such as alkylation sludge, spent alcohol sludge, spent butadiene sludge, spent lube oil sludge, sulfonation sludge and the like.

The suspended iron sulfate preferably comprises at least one compound selected from ferrous sulfate ($FeSO_4$—$H_2O$), ferric sulfate ($Fe_2(SO_4)_3$), ferrous sulfate-heptahydrate ($FeSO_4$-$7H_2O$), ferrous sulfate-pentahydrate ($FeSO_4$-$5H_2O$), ferrous sulfate-tetrahydrate ($FeSO_4$-$4H_2O$) and ferric sulfate ennahyrate ($Fe_2(SO_4)_3$-$9H_2O$). Preferably, at least about 20 weight percent of the iron sulfate is suspended in the concentrated sulfuric acid, more preferably at least about 40 weight percent.

In accordance with the present invention, the fumed silica preferably comprises less than about 5 weight percent of the composition, more preferably from about 0.5 to about 1.5 weight percent. The fumed silica preferably has an average particle size of from about 7 to about 40 nanometers.

Amorphous silica is polymerized silica, which is dehydrated and may be considered as a condensation polymer of silica acid. Amorphous silicas are divided into four groups: silica gel, colloidal silica, precipitated silica, and fumed silica. Fumed silica is typically produced by the vapor phase hydrolysis of silicon tetrachloride in a hydrogen oxygen flame. The combustion process creates silicon dioxide molecules, which condense to form particles, which in turn sinter together into aggregates. Fumed silica is available in treated and untreated grades. The untreated grades vary in surface area, bulk density, and thickening efficiency in nonpolar systems. For example, the Cabot Corporation, Degussa Corporation and Wacker Silicones Corporation produce fumed silica. Cabot products are sold under the trade name CAB-O-SIL and Degussa products are sold under the AEROSIL trade name.

Comparative tests were run to determine which fumed silicas would work satisfactorily. Tests started at 1% by weight levels of fumed silica in 95% technical grade sulfuric acid. It appears that at silica levels below about 0.5%, incomplete suspension occurs, and at levels above about 1.5%, viscosity of the system increases such that pumping may become difficult. Levels of iron sulfate used in the experiments were from 0–40% of the system by weight. In further tests, the system varied from 0% iron sulfate to 40% by weight, fumed silica from 0.5–1.5% by weight, and sulfuric acid 99.5 to 54.5%. Sulfuric acid grades were from dilute 50% to 99.5%, technical to spent.

Preferred fumed silicas include: CAB-O-SIL L-90, MS-55, HS-5, LM-130, LM-150 and M-5; and Degussa AEROSIL R200, US200, R202, US202, US204 and US206. The preferred fumed silicas comprise average particle sizes of from about 7 to about 40 nanometers.

The silica is added to the concentrated sulfuric acid in order to suspend at least a portion of the iron sulfate. The silica is preferably added with good mixing, which can be achieved with the use of a pump, stirrer or the like.

After the fumed silica is mixed in to form a suspension system, this system can be used in suspending iron sulfate that is in the bottom of fresh acid or spent acid tanks and/or vessels. By injecting this suspension system into the tank or vessel with mixing, the iron sulfate will stay suspended in the liquid and can be removed from the tank/vessel. Typical tanks/vessels for containing concentrated sulfuric acid are made of materials such as carbon steel having a carbon content of about 0.20 weight percent, or 304 or 316 stainless steel.

In accordance with the present invention, the use of fumed silica reduces iron sulfate deposits substantially. Iron sulfate deposits are preferably reduced by at least about 50 weight percent, more preferably at least about 80 or 90 weight percent.

The system has been found to be stable in lab tests for six months, and is preferably stable for two to four weeks or more in the field.

Whereas particular embodiments of this invention have been described above for purposes of illustration, it will be evident to those skilled in the art that numerous variations of the details of the present invention may be made without departing from the invention as defined in the appended claims.

What is claimed is:

1. A composition comprising concentrated sulfuric acid, iron sulfate suspended in the concentrated sulfuric acid, and fumed silica.

2. The composition of claim 1, wherein the sulfuric acid has a concentration of from about 50 to about 99.5 weight percent.

3. The composition of claim 1, wherein the sulfuric acid has a concentration of from about 93 to about 98 weight percent.

4. The composition of claim 1, wherein the iron sulfate is at least one compound selected from the group consistsing of $FeSO_4$—$H_2O$, $Fe_2(SO_4)_3$, $FeSO_4$-$7H_2O$, $FeSO_4$-$5H_2O$, $FeSO_4$-$4H_2O$ and $Fe_2(SO_4)_3$-$9H_2O$.

5. The composition of claim 1, wherein at least about 20 weight percent of the iron sulfate of the composition is suspended in the concentrated sulfuric acid.

6. The composition of claim 1, wherein at least about 40 weight percent of the iron sulfate of the composition is suspended in the concentrated sulfuric acid.

7. The composition of claim 1, wherein the fumed silica comprises less than about 5 weight percent of the composition.

8. The composition of claim 1, wherein the fumed silica comprises from about 0.5 to about 1.5 weight percent of the composition.

9. The composition of claim 1, wherein the fumed silica has an average particle size of from about 7 to about 40 nanometers.

10. The composition of claim 1, wherein the fumed silica is vapor phase hydrolyzed silicon tetrachloride using an hydrogen oxygen flame.

11. The composition of claim 1, wherein the fumed silica is effective to suspend the iron sulfate in the concentrated sulfuric acid.

12. The composition of claim 1, where the iron sulfate is the reaction product of the sulfuric acid and the carbon steel of a vessel containing the sulfuric acid.

13. A method of suspending iron sulfate in concentrated sulfuric acid comprising adding fumed silica to the concentrated sulfuric acid.

14. The method of claim 13, wherein the sulfuric acid has a concentration of from about 50 to about 99.5 weight percent.

15. The method of claim 13, wherein the sulfuric acid has a concentration of from about 93 to about 98 weight percent.

16. The method of claim 13, wherein the iron sulfate comprises at least one compound selected from the group consisting of $FeSO_4$—$H_2O$, $Fe_2(SO_4)_3$, $FeSO_4$-$7H_2O$, $FeSO_4$-$5H_2O$, $FeSO_4$-$4H_2O$ and $Fe_2(SO_4)_3$-$9H_2O$.

17. The method of claim 13, wherein at least about 20 weight percent of the iron sulfate is suspended in the concentrated sulfuric acid.

18. The method of claim 13, wherein at least about 40 weight percent of the iron sulfate is suspended in the concentrated sulfuric acid.

19. The method of claim 13, wherein the fumed silica comprises less than about 5 weight percent of the composition.

20. The method of claim 13, wherein the fumed silica comprises from about 0.5 to about 1.5 weight percent of the composition.

21. The method of claim 13, wherein the fumed silica has an average particle size of from about 7 to about 40 nanometers.

22. The method of claim 13, wherein the fumed silica is vapor phase hydrolyzed silicon tetrachloride using an hydrogen oxygen flame.

23. The method of claim 13, wherein the concentrated sulfuric acid, iron sulfate, and fumed silica are contained in a steel vessel.

24. The method of claim 23, wherein the steel vessel comprises carbon steel including about 0.20 percent carbon.

25. The method of claim 13, wherein the fumed silica is effective to suspend the iron sulfate in the concentrated sulfuric acid.

26. A method of reducing iron sulfate deposits on steel vessels containing concentrated sulfuric acid, the method comprising adding fumed silica to the concentrated sulfuric acid.

27. The method of claim 26, wherein the iron sulfate deposits are reduced by at least about 50 weight percent.

28. The method of claim 26, wherein the iron sulfate deposits are reduced by at least about 80 weight percent.

29. A composition for use in suspending iron sulfate in concentrated sulfuric acid, comprising concentrated sulfuric acid and from 0.5 to 1.5 weight percent, based on total weight of the composition, of fumed silica having an average particle size of from about 7 to about 40 manometers, mixed with the concentrated sulfuric acid.

30. The composition of claim 29, wherein the fumed silica is effective to suspend the iron sulfate in the concentrated sulfuric acid and the iron sulfate is the reaction product of the sulfuric acid and the carbon steel of a vessel containing the sulfuric acid.

* * * * *